(12) United States Patent
Rene et al.

(10) Patent No.: US 6,742,664 B2
(45) Date of Patent: Jun. 1, 2004

(54) BUILDING SYSTEM FOR SUPPORT DEVICE FOR GOODS CARRIERS

(75) Inventors: Svein Rene, Tonsberg (NO); Lars Christian Aamodt, Maura (NO)

(73) Assignee: Shelter Development AS, Stokke (NO)

( * ) Notice: Subject to any disclaimer, the term of this patent is extended or adjusted under 35 U.S.C. 154(b) by 123 days.

(21) Appl. No.: 10/030,110

(22) PCT Filed: Jul. 11, 2001

(86) PCT No.: PCT/NO01/00298

§ 371 (c)(1),
(2), (4) Date: Mar. 15, 2002

(87) PCT Pub. No.: WO02/04246

PCT Pub. Date: Jan. 17, 2002

(65) Prior Publication Data

US 2002/0130099 A1 Sep. 19, 2002

(51) Int. Cl.$^7$ .................................................. A47F 5/00
(52) U.S. Cl. ........................ 211/189; 211/191; 211/175; 410/143
(58) Field of Search ................................ 211/175, 190, 211/191, 189; 248/354.5, 354.3; 410/143, 145, 150, 153

(56) References Cited

U.S. PATENT DOCUMENTS

| 3,051,099 | A | * | 8/1962 | Robertson | |
| 3,062,157 | A | * | 11/1962 | Woods | |
| 3,199,464 | A | * | 8/1965 | Shook | |
| 4,236,854 | A | * | 12/1980 | Rogers | 410/143 X |
| 6,077,007 | A | * | 6/2000 | Porter et al. | 410/143 X |
| 6,186,715 | B1 | * | 2/2001 | Oliviero | 410/143 X |

* cited by examiner

Primary Examiner—Robert W. Gibson, Jr.
(74) Attorney, Agent, or Firm—Dennison, Schultz, Daugherty & MacDonald

(57) ABSTRACT

Construction system for providing load support in the transportation of goods in containers having a floor and a ceiling. The system includes at least one supporting beam and at least two telescopic bar organs, each having a first end disposed on the floor of the container and a second end expandable to the ceiling of the container, pressing thereby against the floor and the ceiling. The bar organs extend through the at least one supporting beam at end areas, and include a plurality of longitudinally disposed holes for locking a bar organ to a supporting beam at a predetermined height by means of a latch pin.

10 Claims, 2 Drawing Sheets

BUILDING SYSTEM FOR SUPPORT DEVICE FOR GOODS CARRIERS

BACKGROUND OF THE INVENTION

The present invention relates to a construction system for providing a load support against substantially horizontal forces, particularly with regard to transportation of goods in containers, trucks etc.

When transporting goods in containers, trucks or other transport situations, it is preferable, or even neck, to ensure that the loaded goods are kept steady during sea or road transportation, especially when there may be powerful sideways movement of the transportation craft, in order to avoid damage of the goods and the environment.

This problem is especially serious in the case of ammunition transport, partially because of the character of the goods and partially because of the ground where such goods often are transported, that is poor roads and terrain.

Until now, stabilization has been achieved by woodwork support. However, there are many disadvantages: large consumption of materials and nails, assembly and disassembly are time consuming, bad flexibility and a large waste problem at the destination end. Also, woodwork is exposed to vermin transfer.

From Norwegian design registration no. 75145, there is known a supporting frame, which is adapted for us in transportation of goods according to these requirements. The known supporting frame is approximately rectangular, that is, mainly a two dimensional frame comprising two beams and two cross beams connecting the beams to each other. Here, the dimensioning acid the application areas are not flexible enough to meet requirements.

From U.S. Pat. No. 3,054,099 (Robertson 1960) it is known to build up horizontal "ladders" in different levels in a loading room, with the possibility of regulating the positions of the individual supporting cross elements. This solution has several disadvantages, e.g. lack of ability regulate precisely and lack of flexibility to make different supporting devices in different parts of a loading room.

From U.S. Pat. No. 3,199,464 (Shock 1961), it is known to assemble movable supports on the vertical parts of a storing shelf. This proposal is not suitable for containers.

SUMMARY OF THE INVENTION

The main object of the present invention is to provide a construction system for load support, intended for use in the transportation of goods, which offers a safe support of goods against the solid parts of the container and/or other types of load supports, containers, vehicles etc. Also powerful shaking and/or influences from mainly horizontal directed displacement forces during the transport must be considered.

Further, it is an object to provide a load support which is flexible, easy to assemble and disassemble, which can be used again and again having low re-usage costs and which in the same way does not cause any pollution.

The versatility is required with regard to both dimensions and in usage. The system has to be adaptable to different ranges in all directions; in height, to adapt the load support to different ceilings under assembly; horizontally, to adapt the load support to different widths of containers or loading rooms and; depth, to provide the essential flexibility, that is to be able to support goods or load occupying different parts of the container or loading room.

The construction system has to be able to resist the horizontal forces or displacements which may occur between the areas of goods/walls supporting each other, and without the risk of damage or even destruction of the load support.

The construction system should be made as a modular system, having simple parts to be fixed set together rapidly and disassembled rapidly as well.

The construction system according to the invention gives, as opposed to known load supports, a mutual support between goods, respectively between the goods and the wall of the container, and respectively the vehicle, on more than two points and thereby practically over a whole surface. The surface is set by the orientation in space of the actual narrow sides and through the length of the poles meant to connect the beams with each other. Accordingly, a safer and more long-lasting support is achieved, compared to known supporting frames.

The invention offers the ability for rapid and versatile configuration of supporting constructions having different dimensions in three directions. A height regulation may be set by different headrooms in containers and loading during assembly. Width regulation may be set according to different cross dimensions and wall structures. And most important is that an adaption to an arbitrary empty room in the length direction may be achieved, either by adjustment of the spreader bars, by using a joint element and/or by placing several load supports after each other.

The system covers most types of loads. It is suitable to fill up almost every empty space in a container etc. All forces are transmitted to the stronger parts of the support. The system can be built up from one beam to numerous beams in a vertical direction, and in three dimensions. This means a function as a wall or as a volume filler. It is the characteristics of the load (weight, number of levels, volume) that sets the parameters for the design of the securing device. In a case where the load requires two levels of support to give a satisfactory securing, there are two levels of supporting beams assembled. In a case where the load requires six supporting levels, there are six levels of supporting beams assembled. The system is extremely versatile, as it is almost steplessly adjustable in width (across the container), and in length (depth of the container) in steps of approximately 20 mm and with the possibility to assemble an extension element and additional supporting frames. Consequently, local construction of load support can be performed with ease, without the use of tools.

BRIEF DESCRIPTION OF THE DRAWINGS

The invention will be described below with reference to the drawings, where

FIG. 4 shows a spreader bar as shown in FIG. 1, while

DESCRIPTION OF THE PREFERRED EMBODIMENTS

Figure 1:
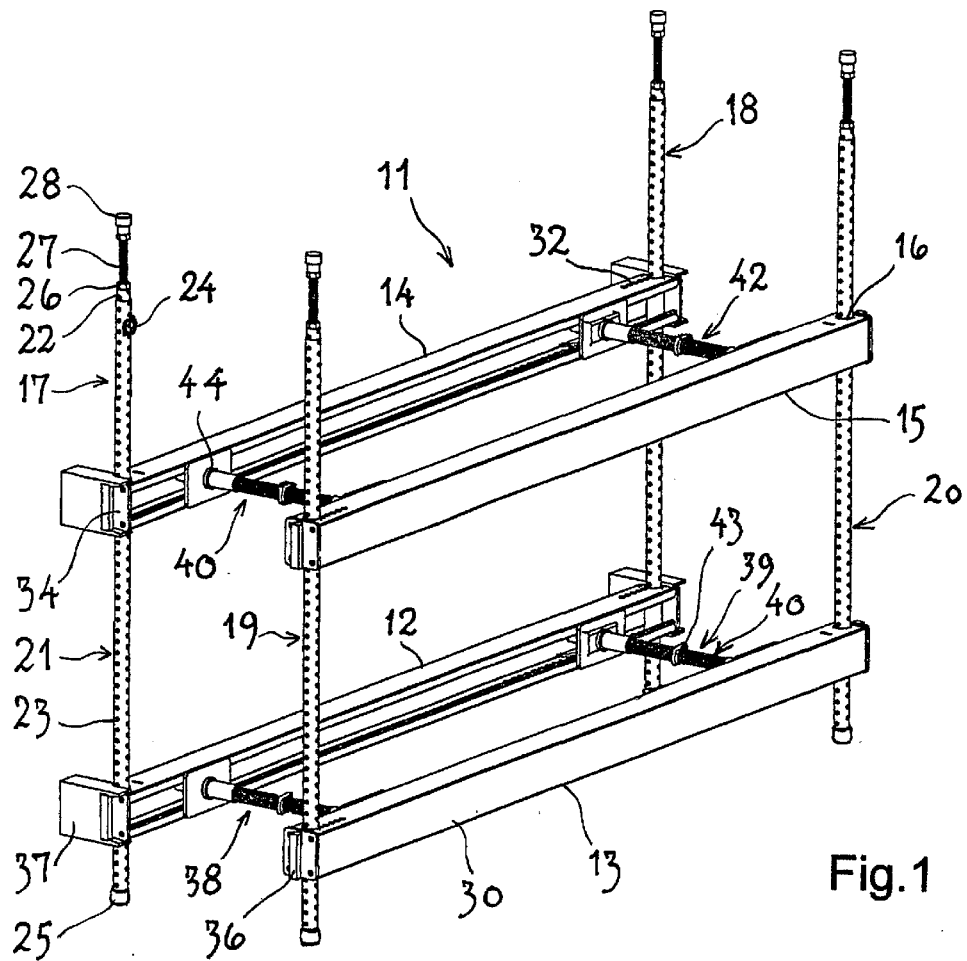
FIG. 1 shows a perspective view of an embodiment of a supporting frame having four supporting beams intended to be placed in a container.

In FIG. 1, there is shown a supporting frame 11 comprising four mutual parallel supporting beams, where two lower supporting beams 12 and 13 are arranged side by side on a lower level, and two upper supporting beams 14 and 15 are arranged directly over the lower. A sleeve 16 extends perpendicularly at each end of the supporting beams 12–15, such that they are vertically orientated in the drawing, four supporting bars are extending in the following way:

Two supporting bars 17 and 18 extend through the sleeves 16 at the ends of the two supporting beams 12, 14 lying in the same vertical plane. Two supporting bars 19 and 20 extend through the sleeves 16 at the ends of the two other supporting beams 13, 15.

The sleeves 16 are overdimensionated relative to the diameter of the supporting bars 17–20, such that the beams can be lead in their place over locking clamps on the supporting bars (described further below). In an alternative embodiment a through-going sleeve can be installed simplifying the fastening of the beams. The sleeves 16 are placed at the ends, outside the telescopic beam area described below.

The supporting bars 17–20 each comprise an exterior, tubular main part 21, extending up to approximately half of the height of the container space, and an inner, telescopic regulation part 22. Both are provided with a longitudinal row of holes 23. To lock these two parts 21 and 22 together, there are locking pins 24 with a securing clip. Both the main part 21 and the regulation part 22 have an end shoe 25 of plastic or rubber, which can be lead through the hole 16.

The end of the inner, tubular telescopic part carries a welded nut 26 or has internal threads. In the nut 26 a threaded bolt 27 is inserted having a pressure head 28 corresponding to the end shoe 25, and which can be pressed against a container ceiling or the ceiling of another load carrier.

In this way, the supporting bars 17–20 can hold the supporting beams 12–15 in position both in the height direction and sideways direction. The supporting beams 12–15 are held in position on the supporting bars 17–20 by means of latch pins 30, which can go through both the main tubular part 21 and/or the regulating part 22. If the latch pins 30 are going through both the tubular parts, they give an additional securing of the beams when they are assembled. The latch pins, which can be of known design, can be loose or fixed to the supporting beams.

Figure 2:
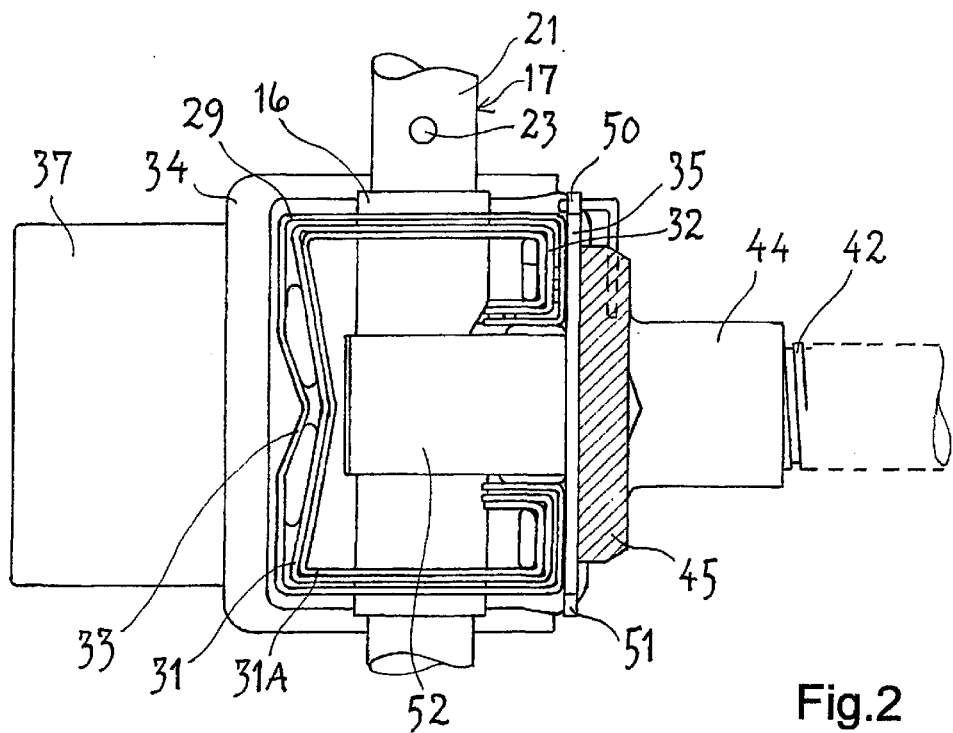
FIG. 2 shows the end of a supporting frame with associated elements.

The supporting beams 12–15 are each comprised of an exterior part 29 (FIG. 2) with a U-profile, closed with a cover plate 35 (FIG. 3) and an inner, telescopic part 31 with a U-profile, both with a bent edge flange 32 and longitudinally bent slot 33. This construction strengthens the supporting beams. In the inner part 31, there is placed a correspondingly profiled strengthening part 31A. Each of the two parts 29 and 31 are provided with a sleeve 16 at their free end as described above. Also, each of them are provided with a row of holes 23 having little distance between, for example 5 cm, to allow mutual locking with short regulation steps. The ends are closed by an end plate 34. The holes in the inner beam 31 and outer beam 29 have different mutual distances apart, for example 2.5 cm and 2.0 cm. Accordingly, the regulating interval will be less than the entire distance.

On each end plate 34 at the ends of the supporting beams, there is fastened, for example by welding or as an integrated part, an outwardly projecting rib 36 of a square profile, extending in the vertical direction in the drawing. The ribs 36 can, by use of the supporting frame 11 in a usual container, be lead out against the side walls and in engagement with reciprocal slots, especially at a door frame. In this way, the supporting frame can be locked against displacement in the longitudinal direction relative to a container or another loading space.

Two of the supporting beams 12 and 14, lying on the same supporting bars 17 and 18, are provided with supporting blocks 37 at each end projecting broadwise out relative to the supporting beam. The supporting blocks 37 are rectangular, and can be manufactured of plastic. The intention of these is to avoid the beams 12–15 bearing against the container wall, but transmitting force to the structure of the container which is not lying in the same plane as the wall, but retracted. Because the horizontal distance from the inner corrugation to the supporting structure varies, the supporting blocks can be provided in two parts. The block can vary in thickness, such that the beam is lying at the optimal distance from the container wall. In this way the broadwise load arising during use can be transmitted from the supporting frame 11 to the structure of the container.

Figure 4:
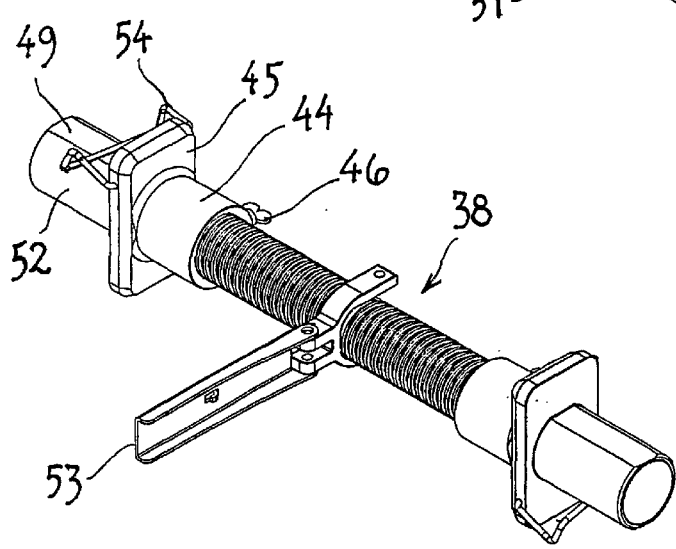

Between the two sets of supporting beams 12 and 13, 14 and 15 respectively (being at the same height) a couple of spreader bars 38 and 39, 40 and 41 respectively are inserted, placed at the outer parts, up to the ends. Each spreader bar 38–41 comprises a threaded stem 42, having a left threaded and a right threaded part with two grip surfaces 43 for a wrench or a handle mounted in between (see FIG. 4). The threaded stem 42 engages at each end in a reciprocal thread in a sleeve 44 mounted on a construction plate 45 with a through-going hole. The sleeve 44 projects into the inside of the supporting beams 12–15. In FIG. 4 a more detailed example of a spreader bar 38, having sleeves 44 mounted thereon, is shown.

Turning of the threaded stem 42 with a wrench or a handle will either push the beams away from each other, or pull them together. In the sleeve 44, a screw (46 in FIG. 4) is fastened that, when screwed in, engages with the threaded stem 42 and prevents it from rotation. In this way the beams can be locked at the correct distance when the necessary regulation is done.

Figure 3:
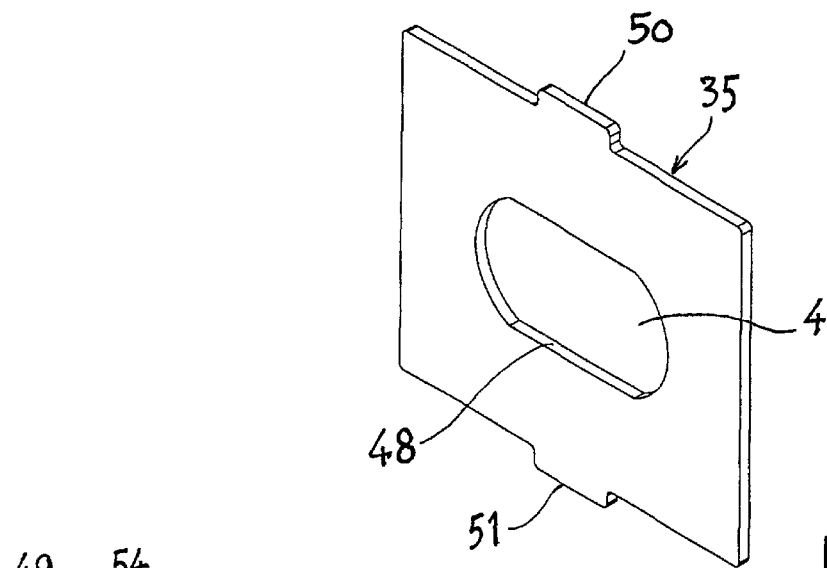
FIG. 3 shows a perspective view of a covering plate, which is to be fastened to a supporting beam.

In FIG. 3 the covering plate 35 is shown, intended for welding and the like on the outer U-profile of a supporting beam. The covering plate 35 has a long opening 47 with two opping sides 48 engaging against the corresponding flanges 49 on the inner part of the sleeve 44 (FIG. 4). On the upper edge and on the lower edge, a tongue or pin 50, 51 serves to fix the end of a spreader bar as described further below. Each supporting beam will have two covering plates 35, one at each end, for engagement of the two spreader bars connected to each supporting beam.

In FIG. 4, a spreader bar 38 is shown with associated fastening equipment: sleeves 44 at each end of an oppositely threaded part, a lock screw 46 in each sleeve 44, a construction plate 45 on each sleeve 44, intended to provide support against a covering plate 35, and an outwardly projecting end 52 with flattened opposite sides 49 corresponding to the opening in the covering plate 35.

On each construction plate 45 with an upwardly projecting and a downwardly projecting end, a U-shaped, bent clamp spring 54 is fastened having eccentric support of the end leg in the opposite sides of the construction plate, such that it can be swung over the tongue 50 or 51 of cover plate 35 lying up to it. The eccentric support creates a pre-tensioning against the out-swung locking position. In this way the spreader bar 38 is held together with the supporting beam.

Figure 5:
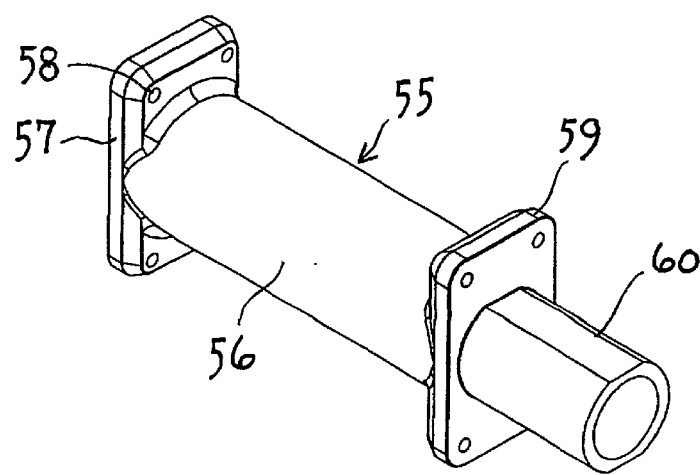
FIG. 5 shows a perspective view of an extension sleeve.

In FIG. 5, an extension element is shown in the shape of a connection coupling 55 for mounting on the free end of a sleeve 44, to fill up a larger empty space than possible using the fully unscrewed threaded stem. The connection coupling comprises a central, tubular trunk 56, one end of which fits overin on the outwardly projecting end 52 and where one end has a flange plate 57 corresponding to the construction plate 45 and can be fastened to this, for example by means of screws in holes 58.

At the opposite end, the extension element 55 is provided with a stop piece 59 and an outwardly projecting end 60, like the spreader bar of FIG. 4. In this way, the end of the extension element 55 can be fastened to a supporting beam in the same way as the spreader bar in FIG. 4.

Because the holes in the cover plates 35 are oval in the horizontal plane, the spreader bars 38–41 can have an angle relative to the beam in those cases where the end of one beam meets the outer corrugation in the adjacent container wall, while the end of the other beam meets the inner corrugation of the same wall. Then, the holes will be displaced approximately 37 mm relative to each other.

The supporting bars 17–20 can be attached to an arbitrary number of supporting beams and associated spreader bars, to support and to give stop for an arbitrary load composition.

Range of application

The supporting frame 11 shown in this example, can be inserted at the end of a container or loading space, as a support against goods which do not entirely fill the disposable room. It can also be placed within a cargo, between two parts of the load. The number of levels having supporting beams 12–15 can be adjusted according to need, practically up to 15 levels. The grip organs or the ribs 36 can be lead to engagement to slots at the door opening and the supporting blocks 37 can be put up against one of the corner posts of the container.

Threaded stems and extension elements can be made with different lengths, such that the system can be adapted to different distances between the pair of beams and therefore for different ranges of application.

Modifications

The shown construction of a load support is only an example which can be modified in different ways. In some cases, the load support can be used as a wall without substantial dimension in the longitudinal direction. In this case, only two supporting bars and a suitable number of supporting beams, mounted on these, are required.

What is claimed is:

1. Construction system for providing load support in transportation of goods in containers having a floor and a ceiling, comprising at least one supporting beam and at least two telescopic bar organs, each said bar organ having a first end disposed on the floor of the container and a second end expandable to the ceiling of the container, pressing thereby against the floor and the ceiling, the bar organs extending through the at least one supporting beam at end areas, and including a plurality of longitudinally disposed holes for locking a bar organ to a supporting beam at a predetermined height by means of a latch pin.

2. Construction system according to claim 1, wherein each pair of bar organs passes through at least two supporting beams.

3. Construction system according to claim 1, wherein each of said supporting beams has holes located at each end through which the bar organs pass.

4. Construction system according to claim 2, wherein the bar organs comprise telescopic tubes comprising a lower external tube extending upwardly from the floor, and an internal tube extending upwardly to the ceiling.

5. Construction system according to claim 1, wherein the supporting beams have at each end an outwardly projecting rib, constructed and arranged to engage in corresponding slots in a wall.

6. Construction system according to claim 1, wherein the at least one supporting beam comprises at each end a broadwise, outwardly projecting element having an outer supporting surface, to provide support against a wall.

7. Construction system according to claim 1, comprising a set of supporting beams disposed parallel to each other at the same height, the set of supporting beams connected by loosenable connection bars.

8. Construction system according to claim 7, wherein the connection bars comprise threaded stems with a left-threaded and a right-threaded part, each having mounted, threaded sleeves which are fixedly connected to the supporting beams to transmit pressure therebetweeen.

9. Construction system according to claim 8, wherein the at least one supporting beam is telescopically assembled with an outer U-profile and an inner U-profile, the outer U-profile being attached to two cover plates, each cover plate having an opening for leading one of the threaded sleeves of the connection bars therethrough.

10. Construction system according to claim 1, wherein the bar organs are constructed and arranged for engagement of supporting beams in more than two levels.

* * * * *